July 2, 1929.    H. V. REED    1,719,624
DRIVEN PLATE FOR FRICTION CLUTCHES
Filed June 29, 1927

Inventor:—
Harold V. Reed
By Wm. O. Beck, Atty.

Patented July 2, 1929.

1,719,624

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

DRIVEN PLATE FOR FRICTION CLUTCHES.

Application filed June 29, 1927. Serial No. 202,240.

This invention relates to friction clutches of the kind wherein a friction plate driven member is interposed between two parts of a driving member and is adapted to be gripped or clamped by the parts under sufficient pressure to impart motion from the driving member to the driven member.

The object of the present invention is to provide a driven plate of novel construction which, by means of an interposed yielding cushion, will absorb the noises due to periodic vibrations of the engine, and to make the cushion heavier at the points of pressure than elsewhere for greater efficiency in service.
In the accompanying drawings illustrating a selected embodiment of the invention;

Figure 1:
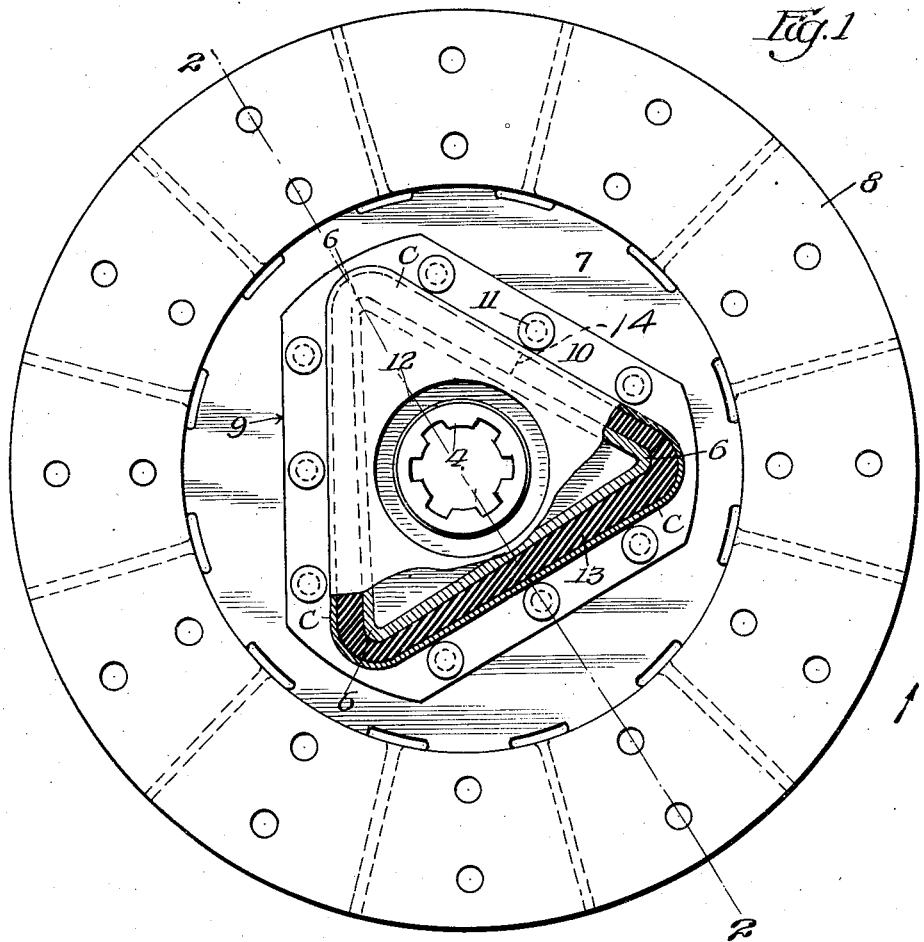
Fig. 1 is an elevation of the driven plate partly broken away and in section.
Figure 2:
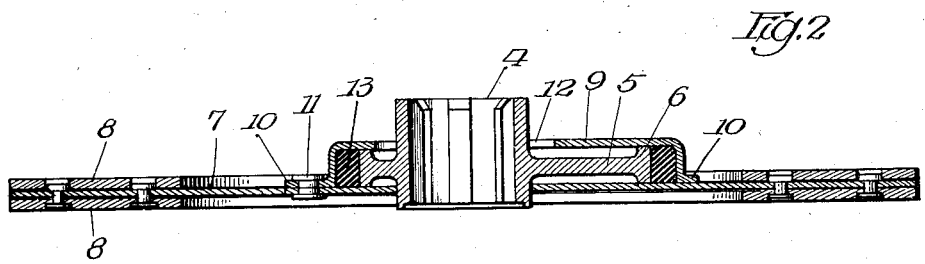
Fig. 2 is a sectional view on the line 2—2 of Fig. 1.

Referring to the drawings, the driven plate comprises a friction member, which is mounted upon a centrally disposed hub member, and a compressible cushion interposed between said members and having an extended contact surface so that movement of the friction member is communicated through the cushion, and by compression only of the cushion, to the hub member.
The hub member comprises a hub 4 having an integral flange 5 which, in the embodiment herein shown, is triangular in shape and has its three angles 6 symmetrically disposed about the hub.
The friction member comprises a flat plate ring 7, which is mounted loosely on the hub adjacent one side of the flange. Friction facing rings 8 of suitable material are fastened to the plate ring at and adjacent its periphery and on opposite sides thereof.

A casing 9 of triangular shape is provided with a peripheral flange 10 arranged to lie against the plate ring 7 and to which it is secured by rivets 11, or other suitable fastening devices. The casing has a centrally disposed opening 12 to receive the hub and between this opening and the flange 10 the casing is upset to receive the hub flange 5 and to form a cushion chamber about the periphery of the hub flange. A cushion 13 made of rubber or other suitable cushion material is arranged in this chamber and fills the chamber formed between the plate ring, the hub flange and the casing and it extends entirely around the hub flange. The cushion may consist of a single strip with its ends abutting at 14, or at some other location in the chamber, or the cushion may consist of a plurality of strips, as desired.

When the friction member is revolved in the direction indicated by the arrow Fig. 1, the cushion will be compressed at and adjacent the parts marked c because the friction member will move relatively to the hub member, depending upon the resistance of the cushion and the hub member, and the chamber will be narrowed at and adjacent to the parts marked c and will be widened correspondingly at the opposite sides of the angles of the chamber, and the material of the cushion, which is snugly confined within the chamber, will flow lengthwise of the cushion under compression and without being subjected to tension. That part of the cushion which is seated in each of the three lengths of the chamber between the angles thereof is of largest section where the compression is greatest, and tapers down to its other end, and the chamber is correspondingly shaped to accommodate the cushion. In normal position at rest the hub flange is eccentrically disposed in the casing. This construction provides a maximum quantity of cushion material where the compression is heaviest and a tapering off of the cushion material to the point where there is no compression. The cushion material under compression may flow towards that part of each straight length of the chamber where compression is lightest and where there is no compression.

The friction member and the hub member are maintained in proper concentric relation by the construction wherein the cushion 13 is confined within a chamber between the periphery of the flange on the hub member and the plate ring and casing of the friction member. The friction member is guided on the flange of the hub member in any relative movement of these members. The friction member is constantly maintained in proper position concentrically and radially with respect to the hub member at all times.

I have shown the invention in a form which I consider commercially desirable, but I do not confine myself to this particular construction, arrangement and proportion of parts, but reserve the right to make all such changes which fairly fall within the scope of the following claims.

I claim:

1. A driven plate for friction clutches comprising a hub member, a friction member, and a cushion of varying thickness, there being a chamber of triangular shape between said members to receive said cushion and corresponding cross-sectionally to the varying thickness of the cushion, with the largest parts of the cushion located where the compression force is greatest.

2. A driven plate for friction clutches comprising a hub member, a friction member, and a cushion of varying thickness, there being a chamber of triangular shape between said members to receive said cushion and corresponding cross-sectionally to the varying thickness of the cushion, that part of the cushion in each straight length of the chamber being tapered from the end which receives the greatest compression force to its other end.

HAROLD V. REED.